United States Patent
Jois et al.

(10) Patent No.: US 10,795,869 B2
(45) Date of Patent: Oct. 6, 2020

(54) AUTOMATIC ENFORCEMENT OF DATA RETENTION POLICY FOR ARCHIVED DATA

(71) Applicant: SAP SE, Walldorf (DE)

(72) Inventors: Sharath Jois, Bangalore (IN); Tenzin Choegyen, Bir (IN)

(73) Assignee: SAP SE, Walldorf (DE)

( * ) Notice: Subject to any disclaimer, the term of this patent is extended or adjusted under 35 U.S.C. 154(b) by 442 days.

(21) Appl. No.: 15/725,825

(22) Filed: Oct. 5, 2017

(65) Prior Publication Data

US 2019/0108246 A1  Apr. 11, 2019

(51) Int. Cl.
| G06F 16/00  | (2019.01) |
| G06F 16/215 | (2019.01) |
| G06F 16/21  | (2019.01) |
| G06F 16/23  | (2019.01) |
| G06F 16/90  | (2019.01) |
| G06F 16/11  | (2019.01) |

(52) U.S. Cl.
CPC .......... *G06F 16/215* (2019.01); *G06F 16/113* (2019.01); *G06F 16/122* (2019.01); *G06F 16/219* (2019.01); *G06F 16/2365* (2019.01); *G06F 16/90* (2019.01)

(58) Field of Classification Search
CPC .... G06F 16/215; G06F 16/113; G06F 16/122; G06F 16/90; G06F 16/2365; G06F 16/219

See application file for complete search history.

(56) References Cited

U.S. PATENT DOCUMENTS

| 7,613,726 B1 * | 11/2009 | Spivak ............... G06F 16/9535 |
| 2007/0276843 A1 * | 11/2007 | Lillibridge ........... G06F 16/125 |
| 2008/0263297 A1 * | 10/2008 | Herbst .................. G06F 16/113 711/161 |

(Continued)

OTHER PUBLICATIONS

"Activating Storage and Retention Service (SRS) for ILM Stores," retrieved from https://help.sap.com/viewer/7ce8e5dc89d7407e8baa9de7b775f31f/750%20SP08/en-US/17514993e81a40e9bdc05821fae6bdf2.html, on or before Sep. 2017, 2 pages.

(Continued)

*Primary Examiner* — Alexander Khong
(74) *Attorney, Agent, or Firm* — Klarquist Sparkman, LLP

(57) ABSTRACT

Techniques and solutions are described for facilitating data archival, including for improving compliance with retention policies and legal requirements. Data objects can be assigned an expiration date based on properties of the data objects and rules associated with such properties. The data objects can be stored in an archive. In some cases, the data objects can be automatically deleted when the expiration date passes. In other cases, the data objects can be manually deleted when the expiration date passes, with deletion not occurring, and an error being generated, if the expiration date has not passed. Unstructured data objects can be associated with structured data objects through association lists, where an association list can be used to delete such unstructured data objects with or without deletion of an associated structured data object, and where the unstructured data objects can be linked with retention policy information of the structured data object.

20 Claims, 10 Drawing Sheets

(56) References Cited

U.S. PATENT DOCUMENTS

| | | | | |
|---|---|---|---|---|
| 2012/0030180 | A1* | 2/2012 | Klevenz | G06F 16/113 707/661 |
| 2017/0039227 | A1* | 2/2017 | Herbst | G06F 16/219 |
| 2017/0091479 | A1* | 3/2017 | Pluder | G06F 16/125 |
| 2017/0131944 | A1* | 5/2017 | Bruckner | G06F 3/0605 |
| 2017/0132401 | A1 | 5/2017 | Gopi et al. | |

OTHER PUBLICATIONS

"Attachment Service," retrieved from https://help.sap.com/doc/788fa4c7585e415187e347e904010cee/1708%20500/en-US/e707f357eb96be12e10000000a4450e5.html, on or before Sep. 2017, 1 page.

"Category Archives: Uncategorized," retrieved from https://webcache.googleusercontent.com/search?q=cache:bf6ajDRSAnsJ:https://blogs.sap.com/category/uncategorized/page/1890/+&cd=2&hl=en&ct=clnk&gl=us, on or before Sep. 2017, 27 pages.

"Content Management Interoperability Services," retrieved from https://en.wikipedia.org/wiki/Content_Management_Interoperability_Services, on or before Sep. 2017, 5 pages.

"Document Service," retrieved from https://help.sap.com/viewer/b0cc1109d03c4dc299c215871eed8c42/Cloud/en-US, on or before Sep. 2017, 4 pages.

"Enterprise content management," retrieved from https://en.wikipedia.org/wiki/Enterprise_content_management, on or before Sep. 2017, 18 pages.

"In which SAP table attachment link stores?" retrieved from https://archive.sap.com/discussions/thread/2074548, on or before Sep. 2017, 6 pages.

"Print-list archiving," retrieved from https://www.ibm.com/support/knowledgecenter/en/SSRW2R_2.2.0/com.ibm.iccsap.doc/doc/o_features_printlists.html, on or before Sep. 2017, 1 page.

"Registering IILM Store in SRS Store Administration," retrieved on or before Sep. 2017, 1 page.

"S_ILM_SRS_ILM Storage and Retention Service," retrieved from https://www.consolut.com/en/s/sap-ides-access/d/s/doc/YL-S_ILM_SRS/, on or before Sep. 2017, 3 pages.

"SAP ABAP Application Component BC-ILM-SRS (Storage and Retention Service)," retrieved from https://www.sapdatasheet.org/abap/bmfr/byi3000122.html, on or before Sep. 2017, 1 page.

"SAP ABAP Package S_ILM_DAS (ILM SRS: ILM Storage and Retention Service)," retrieved from https://www.sapdatasheet.org/abap/devc/s_ilm_das.html, on or before Sep. 2017, 1 page.

"SAP ABAP Package S_ILM_DAS_COMMADS (ILM SRS: SRS Commands)," retrieved from https://www.sapdatasheet.org/abap/devc/s_ilm_das_commands.html, on or before Sep. 2017, 1 page.

"SAP Cloud Platform Document Services," retrieved from https://help.hana.ondemand.com/hana_cloud_platform_mobile_services/frameset.htm?c58de78f76a746afb807dc08bd714b23.html, on or before Sep. 2017, 2 pages.

"Store and Manage All Your Documents with SAP Cloud Platform Document service," retrieved from https://cloudplatform.sap.com/capabilities/data-storage/document-service.html, on or before Sep. 2017, 6 pages.

"Storing Print Lists," retrieved from https://help.sap.com/saphelp_nw70ehp3/helpdata/en/4c/e654b17e173ec6e10000000a42189b/frameset.htm, on or before Sep. 2017, 2 pages.

"Using the LM Store Browser for SRS-Based Stores," retrieved from https://help.sap.com/viewer/7ce8e5dc89d7407e8baa9de7b775f31f/750%20SP08/en-US/d0d2bb5c863d420b91246e92c16205e1.html, on or before Sep. 2017, 3 pages.

"WebDAV," retrieved from https://en.wikipedia.org/wiki/WebDAV, on or before Sep. 2017, 8 pages.

Berglijung, Martin, "Getting Started with CMIS," retrieved from https://www.packtpub.com/books/content/getting-started-cmis, on or before Sep. 2017, 5 pages.

Gattu, Jayaprakash, "Using Archive Link functionality to store attachments," retrieved from https://blogs.sap.com/2013/01/25/using-archive-link-functionality-to-store-attachments/, on or before Sep. 2017, 4 pages.

Kesavan, Raja, "Linking of Attachment in SAP documents," retrieved from https://blogs.sap.com/2014/09/15/linking-of-attachment-in-sap-documents/, on or before Sep. 2017, 6 pages.

Korschen, Markus. Efficient SAP® R/3®-Data Archiving: How to Handle Large Data Volumes. Springer Science & Business Media, p. 21, 2002.

Nagarajan, Vasidevan, "Integrating ILM with Open Text using SRS Store Service," retrieved from https://blogs.sap.com/2015/12/09/integrating-ilm-with-open-text-using-srs-store-service/, on or before Sep. 2017, 10 pages.

Singh, Richa, "S4HANA: Attachment Service Ways of consumption—DMS and GOS," retrieved from https://blogs.sap.com/2016/03/11/s4hana-attachment-services-ways-of-consumption-dms-and-gos/, on or before Sep. 2017, 8 pages.

Zaidi, Rehan. The Ultimate SAP® User Guide. eCruiting Alternatives, Inc. (JonERP.com). p. 239, 2015.

European Search Report, received in counterpart European Application No. EP18198599, dated Nov. 14, 2018, 9 pages.

* cited by examiner

AUTOMATIC ENFORCEMENT OF DATA RETENTION POLICY FOR ARCHIVED DATA

FIELD

The present disclosure generally relates to managing stored data. Particular implementations relate to automatically enforcing retention policies for stored data.

BACKGROUND

As ever-increasing amounts of electronic records and data are generated, it becomes of greater concern as to how such records and data are maintained, including for archival purposes. That is, periodically, such as when the records and data are not actively being used, such information may be archived. However, it may be desirable to periodically remove information from an archive, including in order to maintain the archive within desired operational parameters (e.g., not exceeding a particular storage size or to limit the rate that storage capacity is added).

In some cases, data must be maintained for particular time periods, which can be specified by an organizational policy or by various laws, regulations, contractual obligations, and the like. Thus, before information can be removed from an archive, it typically needs to be determined whether removal is compliant with any applicable policies or legal considerations.

Apart from resource-use and retention period considerations, data retention is increasingly driven by data privacy laws and regulations. That is, a data subject (which can be a person or a legal entity, such as an organization) can have a proprietary interest in data that concerns the entity. The data subject may be able to request, such as under applicable laws or regulations of a jurisdiction, that an organization delete their data or "forget" them. If the data subject wishes to be forgotten, but policy or legal provisions allow an organization to maintain data regarding the data subject (at least for some additional time), the data subject's data may be subject to access restrictions, such as limiting access to the data to certain users or restricting use of the data to limited purposes.

Determining when data, particularly data associated with a data subject, can, or must, be deleted can be complicated. Attempts have been made to automatically assign expiration dates to data based on various rules that may apply to the data. However, typically, data is not automatically deleted when it can or must be deleted. Rather, a user, for example, manually determines whether particular data can be deleted. If the data can be deleted, the user can manually delete the data. However, these manual processes can be time consuming and error prone. Thus, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating data archival, including for improving compliance with retention policies and legal requirements. Data objects can be assigned an expiration date based on properties of the data objects and rules associated with such properties. The data objects can be stored in an archive. In some cases, the data objects can be automatically deleted when the expiration date passes. In other cases, the data objects can be manually deleted when the expiration date passes, with deletion not occurring, and an error being generated, if the expiration date has not passed. Unstructured data objects can be associated with structured data objects through association lists, where an association list can be used to delete such unstructured data objects with or without deletion of an associated structured data object, and where the unstructured data objects can be linked with retention policy information of the structured data object.

In one aspect, a method is provided for annotating one or more data objects to be archived with expiration dates after which the one or more data objects will be automatically deleted from an archive. A request is received to archive one or more data objects. The one or more data objects are requested from a data store, such an active data store (but in other cases, another archive or other data store). The one or more data objects are received in response to the request.

One or more properties of the one or more data objects are analyzed. Expiration dates are determined that are associated with the one or more data objects based on properties of the one or more data objects. The expiration dates are associated with the one or more data objects. The one or more data objects are sent to be stored, where the data objects are automatically deleted from the archive when their respective expiration dates have passed.

In another aspect, a method is provided for archiving a first data object having an expiration date and automatically deleting the first data object once the expiration date has passed. An archive request is received that includes one or more data objects having expiration dates automatically determined by one or more properties of the one or more data objects. The one or more data objects are stored in an archive. It is automatically determined that an expiration date of a first data object has passed. The first data object is deleted in response to automatically determining that its expiration date has passed.

In a further aspect, a method is provided for deleting objects in an association list. A plurality of structured data objects and a plurality of unstructured data objects are received. The structured data objects have expiration dates automatically determined by one or more properties of the structured data objects. A first structured data object is associated with a first association list identifying one or more unstructured data objects. A request is received that includes an identifier of the first association list and indicates that the one or more unstructured data objects identified in the association list are to be deleted. The one or more unstructured data objects identified in the first association list are deleted in response to the request.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

As ever-increasing amounts of electronic records and data are generated, it becomes of greater concern as to how such records and data are maintained, including for archival purposes. That is, periodically, such as when the records and data are not actively being used, such information may be archived. However, it may be desirable to periodically remove information from an archive, including in order to maintain the archive within desired operational parameters (e.g., not exceeding a particular storage size or to limit the rate that storage capacity is added).

In some cases, data must be maintained for particular time periods, which can be specified by an organizational policy or by various laws, regulations, contractual obligations, and the like. Thus, before information can be removed from an archive, it typically needs to be determined whether removal is compliant with any applicable policies or legal considerations.

Apart from resource-use and retention period considerations, data retention is increasingly driven by data privacy laws and regulations. That is, a data subject (which can be a person or a legal entity, such as an organization) can have a proprietary interest in data that concerns the entity. The data subject may be able to request, such as under applicable laws or regulations of a jurisdiction, that an organization delete their data or "forget" them. If the data subject wishes to be forgotten, but policy or legal provisions allow an organization to maintain data regarding the data subject (at least for some additional time), the data subject's data may be subject to access restrictions, such as limiting access to the data to certain users or restricting use of the data to certain limited purposes.

Determining when data, particularly data associated with a data subject, can, or must, be deleted can be complicated. Attempts have been made to automatically assign expiration dates to data based on various rules that may apply to the data. However, typically, data is not automatically deleted when it can or must be deleted. Rather, a user, for example, manually determines whether particular data can be deleted. If the data can be deleted, the user can manually delete the data. However, these manual processes can be time consuming and error prone. In some cases, if data is not deleted when it can no longer be legally maintained, liability can ensue. Thus, room for improvement exists.

Figure 1:
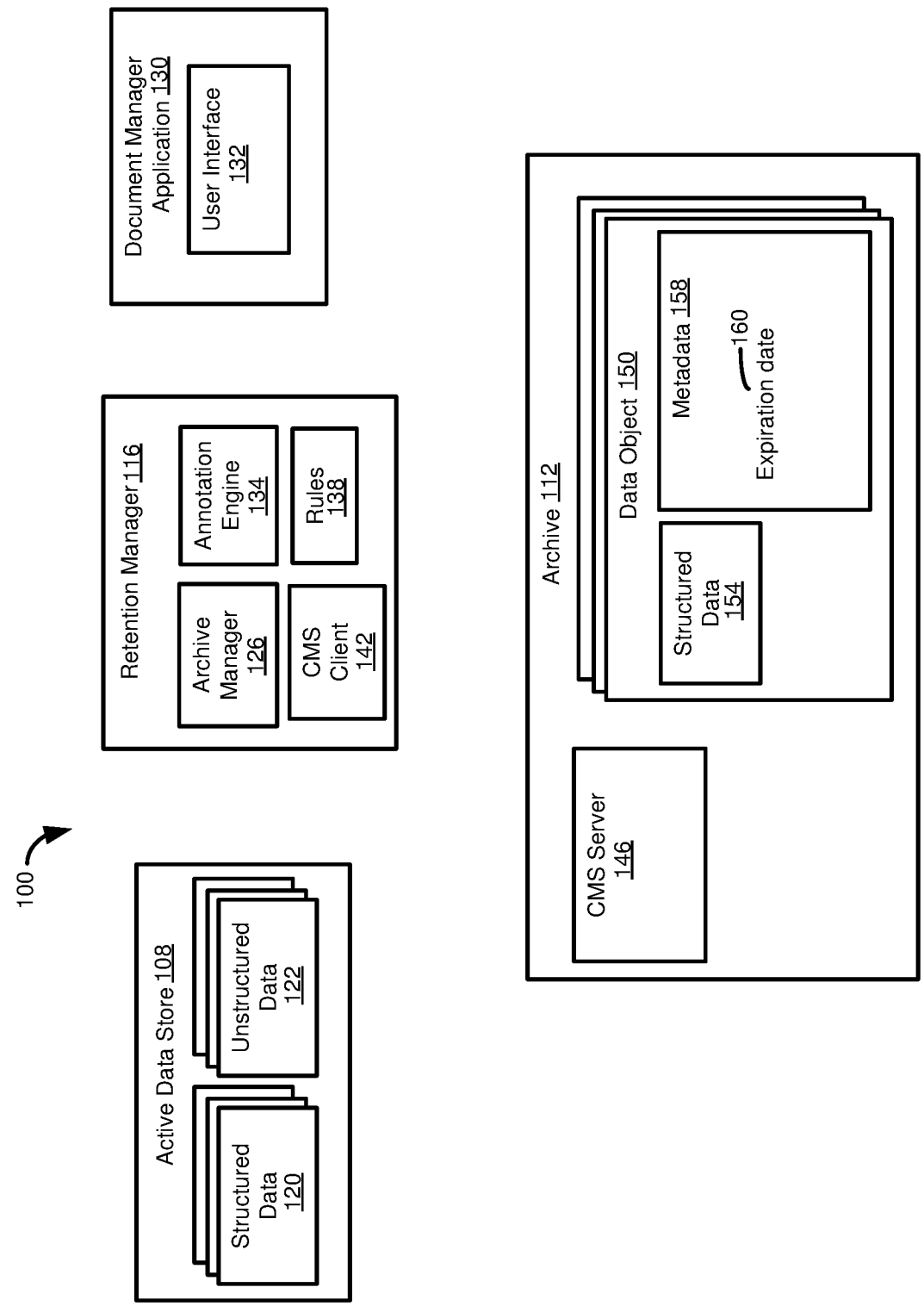
FIG. 1 is a diagram of a system architecture having a retention manager that assigns retention dates to structured data but does not automatically delete structured data when an expiration date has passed.

FIG. 1 illustrates an architecture 100 where data in an active data store 108 can be transferred to an archive 112. The transfer can be mediated by a retention manager 116.

The active data store 112 can include structured data 120 and unstructured data 122. Structured data 120 can be, for example, data maintained in one or more database tables, or data having a particular schema. Unstructured data 122 can be data that is stored in a non-tabular format or without a schema (or, at least, without a known or standardized schema). Unstructured data 122 can include data such as files, images, comments, and social media data. At least some of the unstructured data 122 can be associated with particular structured data 120. For instance, a database record of the structured data 120, or a particular field, may be associated with particular unstructured data 122, such an attachment to the record. As an example, a database record of the structured data 120 can be associated with a document, and an image of the document can be unstructured data 122 that is associated with the record as an attachment.

The retention manager 116 includes an archive manager 126. The archive manager 126 can receive requests to store data in the archive 112, requests to retrieve data from the archive, requests to modify data stored in the archive (including metadata), and requests to delete data from the archive. The requests can be received, in some cases, through a document manager application 130. The document manager application 130 can provide a user interface 132, where a user can receive information regarding data stored in the archive 112, and optionally the active data store 108, and enter various requests involving archived data.

The retention manager 116 also includes an annotation engine 134. The annotation engine 134 can access a rules store 138. The rules store 138 can provide rules that determine when data to be archived can be deleted or must be deleted. The rules store 138 can also provide rules that determine when access to archived data should be limited, and users, and optionally purposes, authorized to access particular data.

Using rules of the rules store 138, the annotation engine 134 can assign a date to data to be archived. The date can be an expiration date, after which the data may be deleted. In some cases, the annotation engine 134 can determine which rules of the rules store 138 apply to particular data using metadata associated with the data. For instance, the data of the active data store 108 may be associated with a type depending on the source of the data (e.g., a particular application or application components that produced or acquired the data). A type may be determined by analyzing a table identifier, record identifier, field identifier, or particular table value. A type may also be determined based on a particular data type associated with the data, such as using a rule that associates particular abstract or composite data types with particular types. Rules may be determined in other ways. In particular examples, rules can be determined by the ILM or ECM software applications of SAP SE of Walldorf, Germany.

The retention manager 116 can include a content management system (CMS) client 142 that is configured to communicate with a CMS server 146 component of the archive 112. The CMS client 142 can process requests (e.g., from the archive manager 126) into a format or protocol useable by the CMS server 146. In a particular example, the CMS client 142 can use the WebDAV protocol to request the CMS server 146 to take actions regarding particular data to be archived or archived data. For instance, the CMS client 142 can request that data be stored or retrieved, changed (including metadata associated with the data), moved within the archive 112, or deleted from the archive.

Within the archive 112, data objects 150 can be stored, where a data object includes structured data 154 and metadata 158 associated with the structured data. The metadata 158 can include an expiration dates 160, where an expiration date can be a date after which the data object 150 (or at least its structured data 154) can be deleted.

Although the architecture 100 can provide some advantages in implementing data retention, it can suffer from some disadvantages. For instance, although the active data store 108 includes structured data 120 and unstructured data 122, many systems (e.g., the retention manager 116 or the archive 112) involved in archiving data are only capable of handling structured data. Thus, in these cases, the archive 112 does not include unstructured data 122, which can complicate managing unstructured data, including having unstructured data that is not associated with an expiration date, and, in at least some situations, having structured data be maintained apart from unstructured data with it may be associated (e.g., storing a database record, but not attachments to the database record).

Another disadvantage of typical document retention systems is that they do not provide for the automatic deletion of data once an automatically assigned retention period has expired. Thus, data typically must be manually deleted from the archive system, which can result in excess storage capacity being used, if such manual deletion is not routinely carried out. Manual systems can also suffer from operator error, with the potential for data to be deleted before a retention period has ended or data not being deleted once an organization no longer has authorization or legal right to maintain the data. Failing to delete data, or restrict access to data, can result in an organization incurring significant liability.

At least certain archival systems may provide the ability to automatically delete data after a set data. However, typically, an expiry date must be manually associated with the data. In addition, typical archival system do not provide the ability to override an expiry date, such as when an organization may acquire authorization to maintain data for additional time, including for purposes of a legal hold.

At least certain archival systems may also not provide the ability to automatically delete unstructured data, such as after an expiration date, even if they are capable of storing unstructured data. In particular, archival systems may not provide the ability to automatically delete unstructured data, such as attachments or draft reports, when parent structured data is deleted. Again, the inability to automatically delete data may increase manual effort, result in excess storage use, and increasing the chance of data being inappropriately deleted or failing to be deleted.

Disclosed technologies can help address the issues described above, including by providing a retention manager that can interface with a broad range of content management systems. In particular, disclosed technologies can provide a system that includes such a retention manager that is in communication with an archive system that can store structured and unstructured data, and which automatically deletes structured and unstructured data. The retention manager can determine when a status change is associated with archived data, such as a legal hold, and provide that archived data is not inadvertently deleted.

Disclosed technologies also provide association lists that link one or more unstructured data objects to a structured data object. An association list allows unstructured data objects to be deleted when a parent structured data object is deleted, or to have their properties (e.g., expiration date or flag status) updated to reflect a change to their parent structured data object. The association list can also be used to delete unstructured data objects even if the parent structured data object is not be deleted in a common request.

Thus, the disclosed technologies can improve the operation of archival systems by reducing storage requirements, as data can automatically be deleted when such data can, or must, be deleted. The disclosed technologies can enhance compliance with policy or legal requirements, including providing that data is automatically deleted when an organization no longer has the right to maintain the data, but also complying with any legal holds or other status changes. Increased accuracy in applying retention policies, and updates, can reduce the chance of legal, contractual, or other types of violations.

Example 2—Example Implementation Architecture

Figure 2:
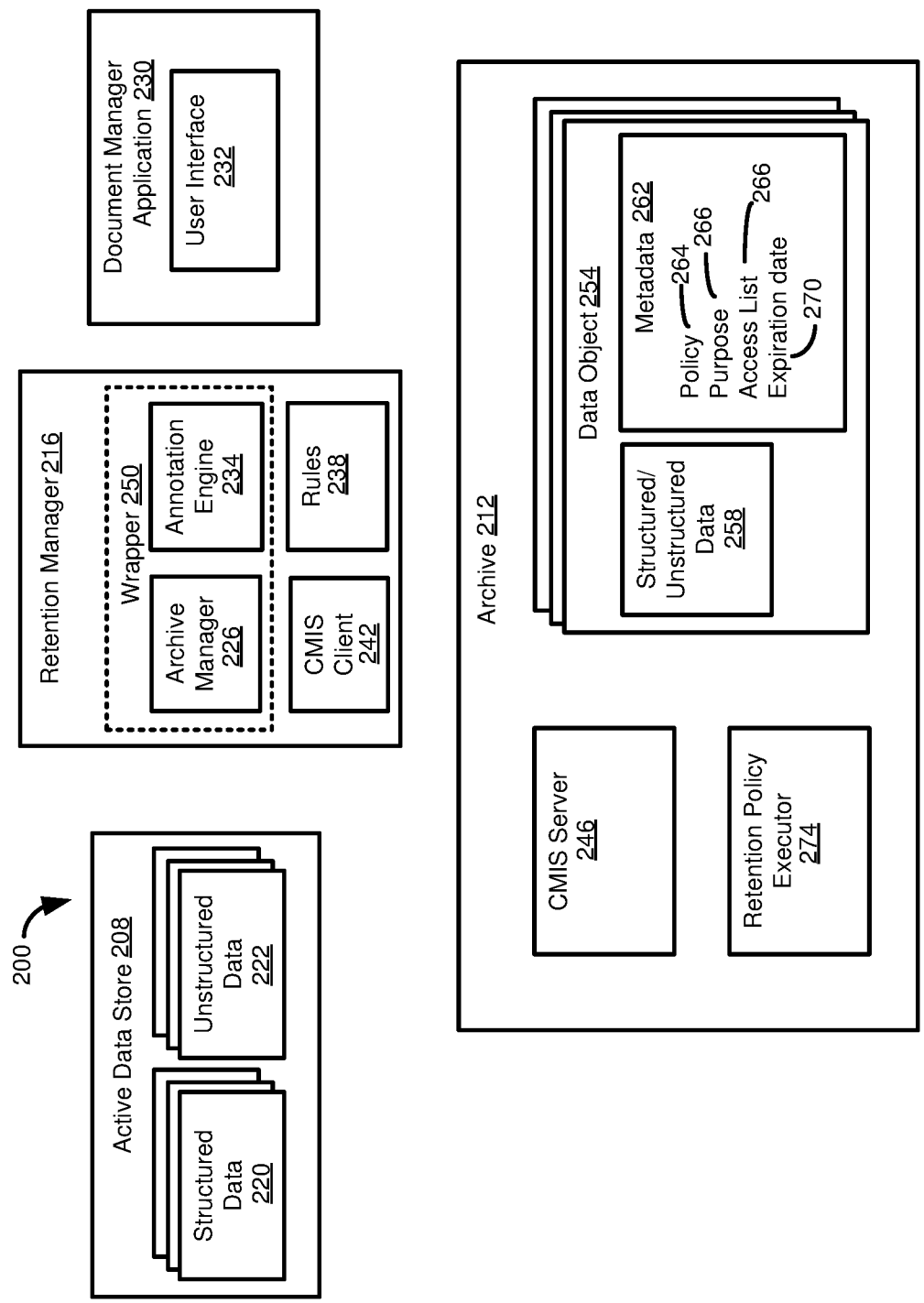
FIG. 2 is a diagram of a system architecture where a retention manager assigns retention dates to data and an archive includes a retention policy executor that can automatically delete data when an expiration date has passed.

FIG. 2 illustrates an architecture 200 where data in an active data store 208 can be transferred to an archive 212. The transfer can be mediated by a retention manager 216. Although described as an active data store, the active data store 208 can be another type of data store without departing from the scope of the disclosed technologies. For instance, the active data store 208 can be another archive (e.g., data objects are being transferred from a first archive to a second archive).

The active data store 208 can include structured data 220 and unstructured data 222. Structured data 220 can be, for example, data maintained in one or more database tables, or in association with a particular schema. Unstructured data 222 can be data that is stored in a non-tabular format or without a schema (or, at least, within a known or standardized schema). Unstructured data 222 can include data such as files, images, comments, and social media data. At least some of the unstructured data 222 can be associated with particular structured data 220. For instance, a database record of the structured data 220, or a particular field, may be associated with particular unstructured data 222, such an attachment to the record. As an example, a database record of the structured data 220 can be associated with a document, and an image of the document can be unstructured data 222 that is associated with the record as an attachment.

The retention manager 216 includes an archive manager 226. The archive manager 226 can receive requests to store data in the archive 212, requests to retrieve data from the archive, requests to modify data stored in the archive (including metadata), and requests to delete data from the archive. The requests can be received, in some cases, from a document manager application 230. The document manager application 230 can provide a user interface 232, where a user can receive information regarding data stored in the archive 212, and optionally the active data store 208, and enter various requests involving archived data.

The retention manager 216 also includes an annotation engine 234. The annotation engine 234 can access a rules store 238. The rules store 238 can provide rules that determine when data to be archived can be deleted or must be deleted. The rules store 238 can also provide rules that determine when access to archived data should be limited, and users, and optionally purposes, authorized to access particular data.

Using rules of the rules store 238, the annotation engine 234 can assign a date to data to be archived. The date can be an expiration date, after which the data is to be deleted. In some cases, the date can be a date after which the data may be deleted. In other cases, the date can be a date after which the data must be deleted. In particular aspects, data can be associated with more than one date, such as being associated with a date after which the data can be deleted and a (different) date after which the data must be deleted. The date (or dates) can be associated with the data as metadata, in some implementations. Metadata assigned by the association engine 234 can specify whether an associated date (e.g., an expiration date) is a mandatory date, after which data must be deleted, or a permissive date, after which data can be deleted.

The annotation engine 234 can associate other metadata with data to be stored in the archive 212, such as metadata that specifies access restrictions. The access restrictions in turn can be used to determine whether a user or application is permitted to access the associated data.

In some cases, the annotation engine 234 can determine which rules of the rules store 238 apply to particular data using metadata associated with the data. For instance, the data of the active data store 208 may be associated with a type depending on the source of the data (e.g., a particular application or application component that produced or acquired the data). A type may be determined by analyzing a table identifier, record identifier, field identifier, or particular table value. A type may also be determined based on a particular data type associated with the data, such as using a rule that associates particular abstract or composite data types with particular types. Rules may be determined in other ways. In particular examples, rules can be determined by the ILM or ECM software applications of SAP SE of Walldorf, Germany.

The retention manager 216 can include a content management interoperability services (CMIS) client 242 that is configured to communicate with a CMIS server 246 component of the archive 212. The CMIS client 242 can process requests (e.g., from the archive manager 126) into a format or protocol useable by the CMIS server 246. For instance, the CMIS client 242 can request that data be stored or retrieved, changed (including metadata associated with the data), moved within the archive 212, or deleted from the archive.

In some cases, at least some components of a retention manager 216 may not be natively configured to interact with the CMIS client 242, or with the CMIS server 246. In such cases, the retention manager 216 can include a wrapper layer 250 for at least the archive manager 226 and the annotation engine 234. The wrapper layer 250 can intercept commands intended for the archive manager 226, and can call functions of the archive manager and the annotation engine 234 as needed to process a request. The wrapper 250 can format or translate data to be useable by the CMIS client 242 (and thus can be referred to as a translator or formatter component). The wrapper 250 can also process data received from the CMIS client 242, including from the CMIS server 246, such as status communications (e.g., whether a command or request executed successfully at the archive 212) and data relating to archived data objects 254.

Within the archive 212, the data objects 254 can be stored, where a data object includes structured or unstructured data 258 and metadata 262 associated with the structured or unstructured data. The metadata 262 can include a policy 264 that determines, at least in part, when the data object 254 can be maintained, when the data object can be deleted, when the data object must be deleted, and any alterations to a normal retention policy. In some cases, a data object 254 that was originally assigned a particular date for deletion can experience a, typically temporary, status change. The status change can be indicated by a flag. As a particular example, a data object 254 may be relevant to a legal proceeding (e.g., a legal hold can be applied to the data object), where the data object is not to be deleted if the flag is set, even if the expiration date otherwise has passed, or passes while the flag is set.

The metadata 262 can include one or more purposes 266, where a purpose can be used to determine whether a particular application or user wishing to access a data object 254 is permitted to do so. That is, a user or application may be associated with one or more purposes, and access to the data object 254 may be permitted if a purpose of the user or application matches, or is consistent with, a purpose specified in the metadata 262.

The metadata 262 can specify an access list 268, which can be a list of users or applications, or particular properties of users or applications that are allowed to access the structured or unstructured data 258 of the data object 254. In some cases the access list 268 may change after the data object 254 is stored in the archive 212. For instance, originally, access to structured or unstructured data 258 of a data object 254 may be unrestricted. At a later time, such as in response to a user request to be forgotten, an access list 268 may be populated.

The metadata 262 can include one or more expiration dates 270, where an expiration date can be a date after which the data object (or at least its structured or unstructured data 258) can be deleted or must be deleted. At least certain data objects can include an expiration date 270 for when the structured or unstructured data 258 for a data object 254 can be deleted and an expiration date after which the structured or unstructured data must be deleted.

The archive 212 can include a retention policy executor 274. The retention policy executor 274 can, at least for some data objects 254, periodically determine if an expiration date 270 has passed, and, if so, and there are no status flags (e.g., legal holds) set, delete the data object from the archive 212. If the expiration date 270 has passed, and the status flag has been set, deletion can be postponed until, and if, the status flag is cleared. For other data objects 254, the retention policy executor 274 can process requests to manually delete data objects from the archive 212. If the retention policy executor 274 determines that an expiration date 270 for the data object 254 has passed, and there are no status flags indicating that the data object should not be deleted, the data object can be deleted. If the expiration date has not passed, or a status flag has been set, the retention policy executor 274 does not delete the document, and can return an error message in response to the deletion request.

Example 3—Example Association Lists

Figure 3:
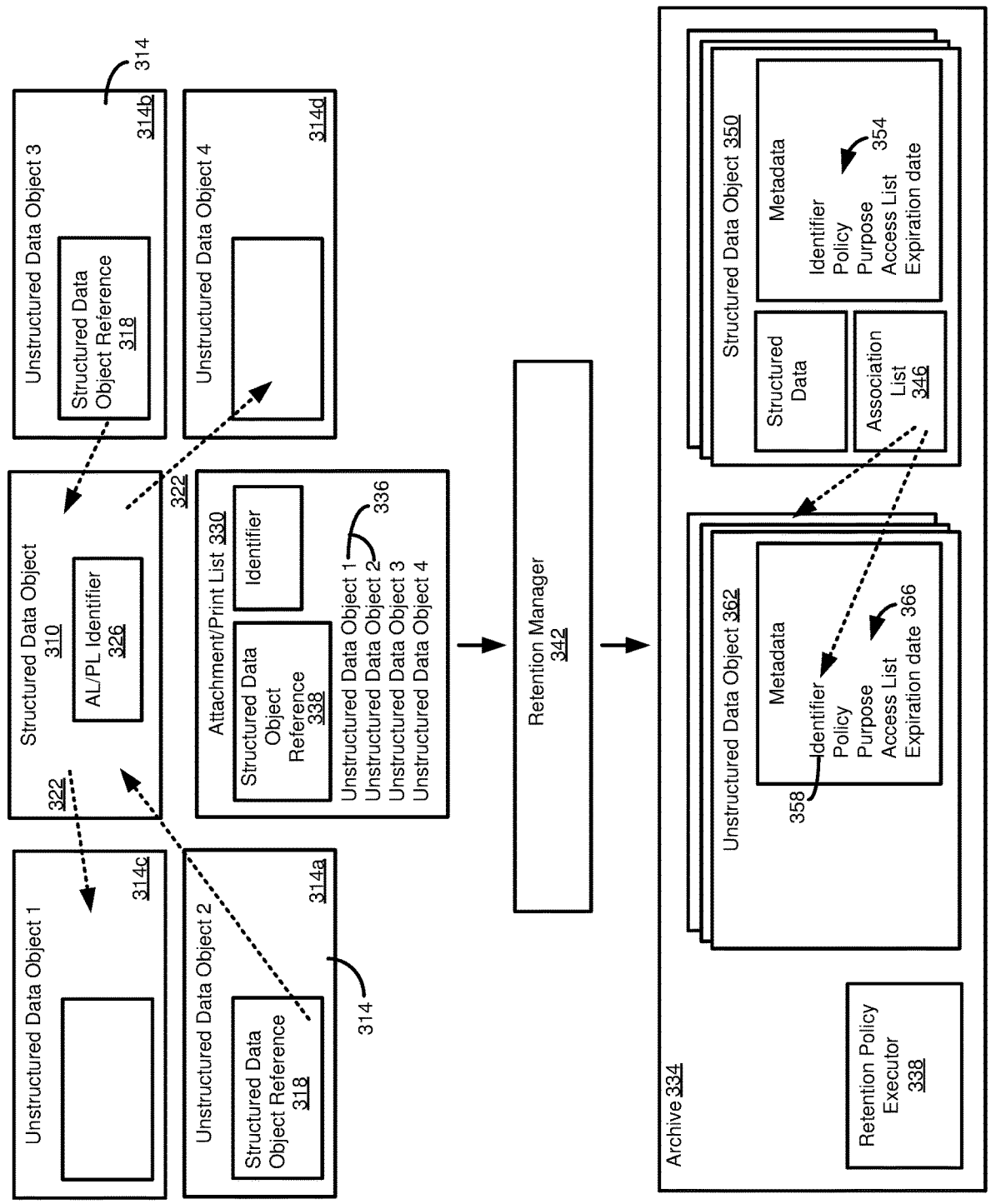
FIG. 3 is a block diagram illustrating how a retention manager can generate an association list that links a structured data object with one or more unstructured data objects.

FIG. 3 illustrates how disclosed technologies can facilitate archive management for structured data that is associated with unstructured data. FIG. 3 illustrates a structured data object 310, such as a database table, or a particular database record of a database table. The structured data object 310 can represent a particular document (e.g., an order, customer record, employee record, etc.)

The structured data object 310 can be directly or indirectly associated with one or more unstructured data objects 314. The unstructured data objects 314 can represent, for example, attachments, such as files, images, comments, social media data, and the like. The unstructured data objects 314 can also represent a print list, where a print list can be a data snapshot at a particular time. The data snapshot can be equivalent to a hard copy, printed report, but can be maintained in an electronic format, such as in a document format (e.g., a PDF document), a data interchange format (e.g., JSON or XML), or as a copy of the relevant data (e.g., one or more database tables containing data used to produce the report or generated by the report).

In some cases, such as with unstructured data objects 314a, 314b, an unstructured data object can include a reference 318 to a structured data object 310 with which it is associated. In other cases, the structured data object 310 can include a reference, indicated by arrows 322, to unstructured data objects 314 with which the structured data object is associated, objects 314c, 314d as shown. A particular implementation can combine these features, with bidirectional linkage between a structured data object 310 and any associated unstructured data objects 314. Or, a unidirectional or bidirectional link can be maintained in another manner.

In some cases, instead of directly storing a link to all or a portion of associated unstructured data objects 314, a structured data object 310 can include a reference 326 to a list 330 that includes references 336 to unstructured data objects that are associated with the structured data object (e.g., by referencing an identifier for the unstructured data object). The list 330 can be an attachment list or a print list, and, in some implementations, can include a reference 338 to any structured data objects 310 with which the list is associated. In particular cases, a list 330 can be associated with a plurality of structured data objects 310. In further cases, a structured data object 310 can be associated with multiple lists 330 (e.g., being associated with one or more attachment lists and one or more print lists), or can be associated with one or more lists and associated in another manner with one or more other unstructured data objects 314.

In typical archival systems, unstructured data objects are not archived along with their associated structured data objects. Even if an archival system provides for storing structured and unstructured data, an association may not be maintained between a structured data object and at least a portion of its associated unstructured data objects. For instance, the association may not be maintained if the unstructured data object, or a list referring to the same, cannot be associated with an identifier of a particular structured data object.

Disclosed technologies can thus be advantageous as maintaining a link between structured data objects 310 and unstructured data objects 314 in an archive 334 that implements a retention policy executor 338, such as the archive 212 of FIG. 2. The structured data objects 310 and unstructured data objects 314 can be processed by a retention manager 342 (e.g., the retention manager 216 of FIG. 2). The retention manager 342 can analyze relationships between unstructured data objects 314 and structured data objects 310 (including using unidirectional or bidirectional linkage information associated with the structured data objects and the unstructured data objects and any lists 330) to generate an association list 346.

The association list 346 can be stored with a structured data object 350 of the archive 334. Although shown as a separate component, the association list 346 can be included as metadata 354 (which can be at least generally similar to the metadata 262 of FIG. 2). Also, although shown as being stored as part of a structured data object 350, in some implementations, the association list 346 can be stored separately from the structured data object, where the structured data object can, for example, include an identifier for any association lists 346 that should be linked with the structured data object. The association list 346 can include identifiers 358 for unstructured data objects 362 stored in the archive 334. The identifiers 358 can be part of metadata 366 of the unstructured data objects 362, which metadata can be at least generally similar to the metadata 262 of FIG. 2.

Maintaining the association list 346 can provide various advantages. For instance, when a structured data object 350 is to be deleted from the archive 334 (or, in some cases, when the structured data object is to be retrieved from the archive) the retention policy executor 338 can automatically delete (or retrieve) unstructured data objects 362 that are linked with the structured data object through the association list. This automatic deletion can improve compliance with policies and legal requirements that restrict how long data can be maintained by an organization, what purposes the data can be used for, and in tracking and enforcing access permissions.

In addition to helping ensure that unstructured data objects 362 are deleted when they should be deleted, association lists 346 can help ensure that unstructured data is not deleted when it should be maintained. For instance, if an expiry date of a parent structured data object 350 is changed, or if a status flag, such as a legal hold, is set for a parent data object, a deletion process of the retention policy executor 338 or the retention manager 342 can be configured to check the status of the parent structured data object before unstructured data objects 362 of an association list 346 are deleted, or an expiry date change or status flag of the structured data object can be propagated to associated unstructured data objects using the association list.

In particular aspects, disclosed technologies can provide for the automatic deletion of unstructured data objects 362 associated with an association list 346. That is, the unstructured data objects 362 can be deleted even if a corresponding structured data object 350 is not being deleted, or is or has been deleted in a separate process. Similarly, expiration dates or status flags associated with unstructured data objects 362 referenced by an association list 346 can be updated without necessarily updating a corresponding structured data object 350.

To facilitate the processing of association lists 346, including in processes that are not triggered by a process for a structured data object 350, an association list can include metadata (not shown). The metadata can be include policy information, purposes, expiration date, and status flags, similar to the metadata 354. The metadata can also include information regarding a source or type of unstructured data object 362 referenced by the association list 346, such as whether the unstructured data object is associated with an attachment list or a print list. The metadata can also include information such as a program used to generate the unstructured data object 362 or the attachment list 346, a program used to archive the unstructured data object, a user associated with the unstructured data object or a request to archive the unstructured data object or association list, a document type (which can be a document type of a parent structured data object 350), other information, or combinations of the forgoing. The metadata can be used as selection criteria for a retrieval request, deletion request, status or expiry date change request, or other types of processes.

Figure 4:
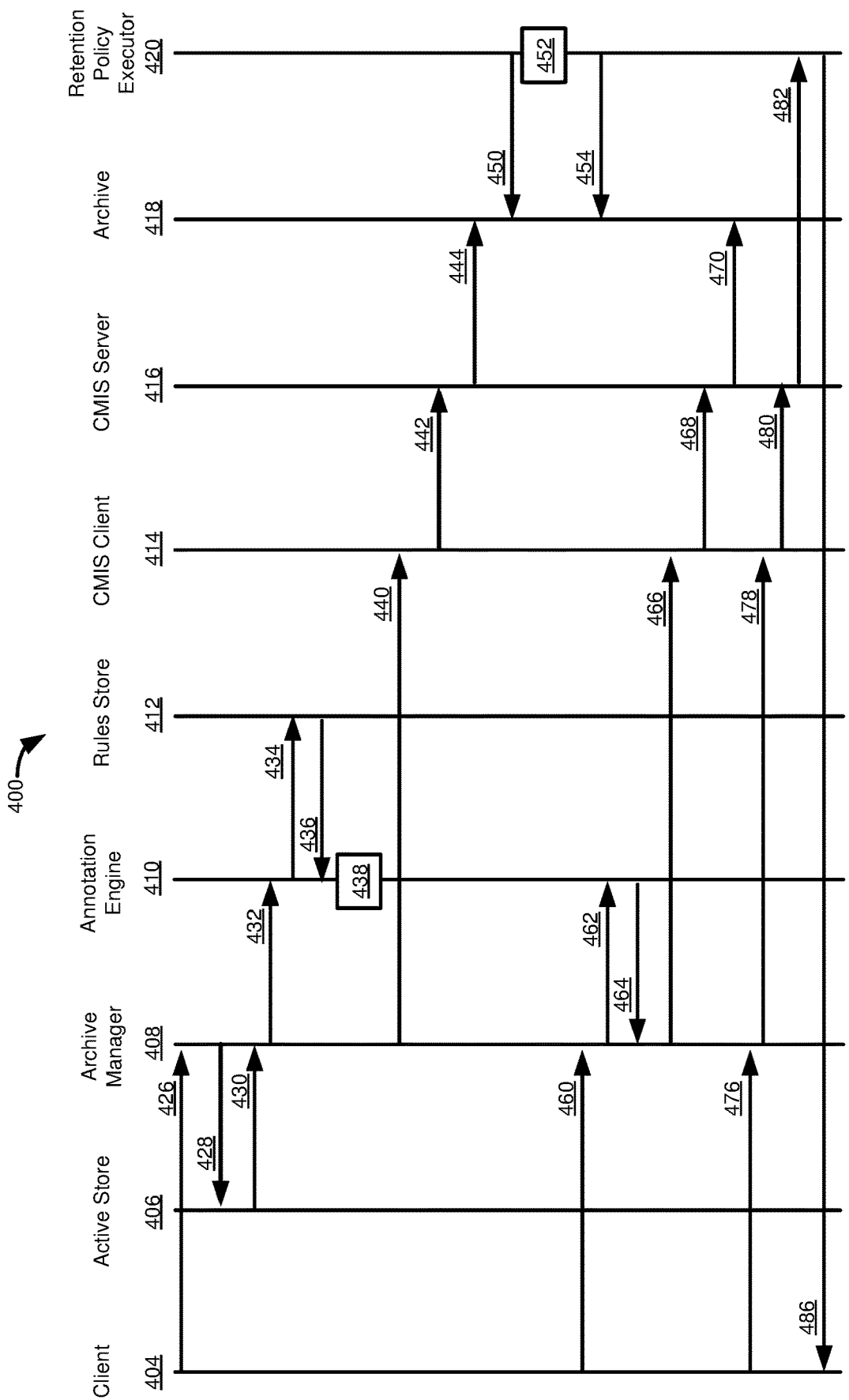
FIG. 4 is a diagram illustrating operations in archiving and deleting data, and updating retention policy information for data objects.

Example 4—Example Assignment of Expiration Dates and Retention Policy Enforcement FIG. 4 presents a diagram for operations involved in storing a data object in an archive, automatically deleting the data object when an expiration event (e.g., the passing or reaching of an expiration date) has occurred, and applying a policy change, such as a legal hold, to the data object. The operations can be carried out by a client 404 (e.g., a user or a client application, including a user of a client application, which can be the document manager application 230 of FIG. 2), an active store 406 where source structured and unstructured data objects are maintained (or, in another cases, another archive), an archive manager 408, an annotation engine 410, a rules store 412, a CMIS client 414, a CMIS server 416, an archive 418, and a retention policy executor 420. The components 406, 408, 410, 412, 414, 416, 418, 420 can, at least in some aspects, be the same as, or generally analogous to, the correspondingly named components illustrated in FIG. 2, and discussed in Example 2.

The client 404 sends an archive request 426 to the archive manager 408. The request 426 can identify one or more structured data objects, unstructured data objects, or a combination thereof, to be transferred to the archive 418. The data objects can be specified directly or indirectly. Indirect specification can include specifying data objects meeting specific criteria. Indirect specification can also include data objects being included in a response to the request 426 because they are linked to another data object directly or indirectly specified by the request (e.g., unstructured data objects that are included in an attachment list or a print list to a structured data object).

The archive manager 408 sends a data object request 428 to the active store 406 for documents specified in the archive request 426. The active store 406 sends the responsive data objects to the archive manager 408 in communication 430. The archive manager 408 makes a call 432 to the annotation engine 410 to determine retention information for the data objects of the archive request 426. Determining retention information can include determining a retention policy that applies to the data objects, and typically includes determining an expiration date (e.g., an expiration date that is calculated based on the retention policy, and optionally individual properties of the data objects, such as a type of a data objects or a date a data object was created or last modified).

In determining a policy or expiration date, the annotation engine 410 can send a request 434 to the rules store 412 for rule or policy information that applies to a particular data object or collection of data objects being annotated by the annotation engine 410. The relevant information is returned to the annotation engine 410 in response 436.

The annotation engine 410 assigns an expiration date (and, optionally, other information, such as a policy, access list, purpose, which can be all or a portion of the metadata 262 of FIG. 2) to the data object or data objects at 438.

Annotated data objects are sent from the archive manager 408 to the CMIS client 414 in communication 440. The annotated data objects are sent by the CMIS client 414 to the CMIS server 416 in communication 442. The annotated data objects are sent from the CMIS server 416 to be stored in the archive 418 at 444.

Periodically, or on an ongoing basis, the retention policy executor 420 can determine whether any data objects in the archive 418 should be deleted. The retention policy executor 420 can access information regarding data objects in the archive 418 in request 450. At 452, the retention policy executor 420 determines whether data objects can be deleted. This determination can include determining if an expiration date has passed, and, optionally whether the data objects are subject to a status flag, such as a legal hold. For instance, if the status flag is set to indicate that a data object should not be deleted, the retention policy executor 420 will not delete the data object even if the expiration date has passed. If the retention policy executor 420 determines that a data object can be deleted, a deletion command 454 can be sent to the archive 418, and the data object deleted.

The client 404 can send to the archive manager 408 a request 460 for a status change to a data object stored in the archive 418. The status change can be a change to a policy that applies to the data object, manual assignment of an expiration date, or setting of a status flag, such as to indicate that the data object is, or is no longer, subject to a legal hold. The request 460 can be forwarded to the annotation engine 410 in communication 462, and the annotation engine 410 can provide a status change package in response 464.

The status change package can be sent from the archive manager 408 to the CMIS client 414 in communication 466, from the CMIS client 414 to the CMIS server 416 in communication 468, and applied to the archive 418 by the CMIS server 416 in process 470. In some embodiments, a status change package can be created directly by the annotation engine 410 and sent to the archive 418, such as via the CMIS client 414 and the CMIS server 416.

The client 404 sends to the archive manager 408 a request 476 to delete a data object from the archive 418. The request is forwarded from the archive manager 408 to the CMIS client 414 at 478, from the CMIS client 414 to the CMIS server 416 at 480, and from the CMIS server 416 to the retention policy executor 420 at 482. The retention policy executor 420 can the carry out the process of 450, 452 to determine whether deletion is allowed. If deletion is allowed, a deletion command 454 can be sent from the retention policy executor 420 to the archive 418.

The results of the deletion request can be returned to the client 404 at 486. That is, the client 404 can be notified if deletion was successful, or if deletion failed. Although shown as being sent directly from the retention policy executor 420 to the client 404, the status communication 486 is typically sent from the retention policy executor 420 to the CMIS server 416, from the CMIS server to the CMIS client 414, from the CMIS client to the archive manager 408, and from the archive manager to the client.

Figure 5:
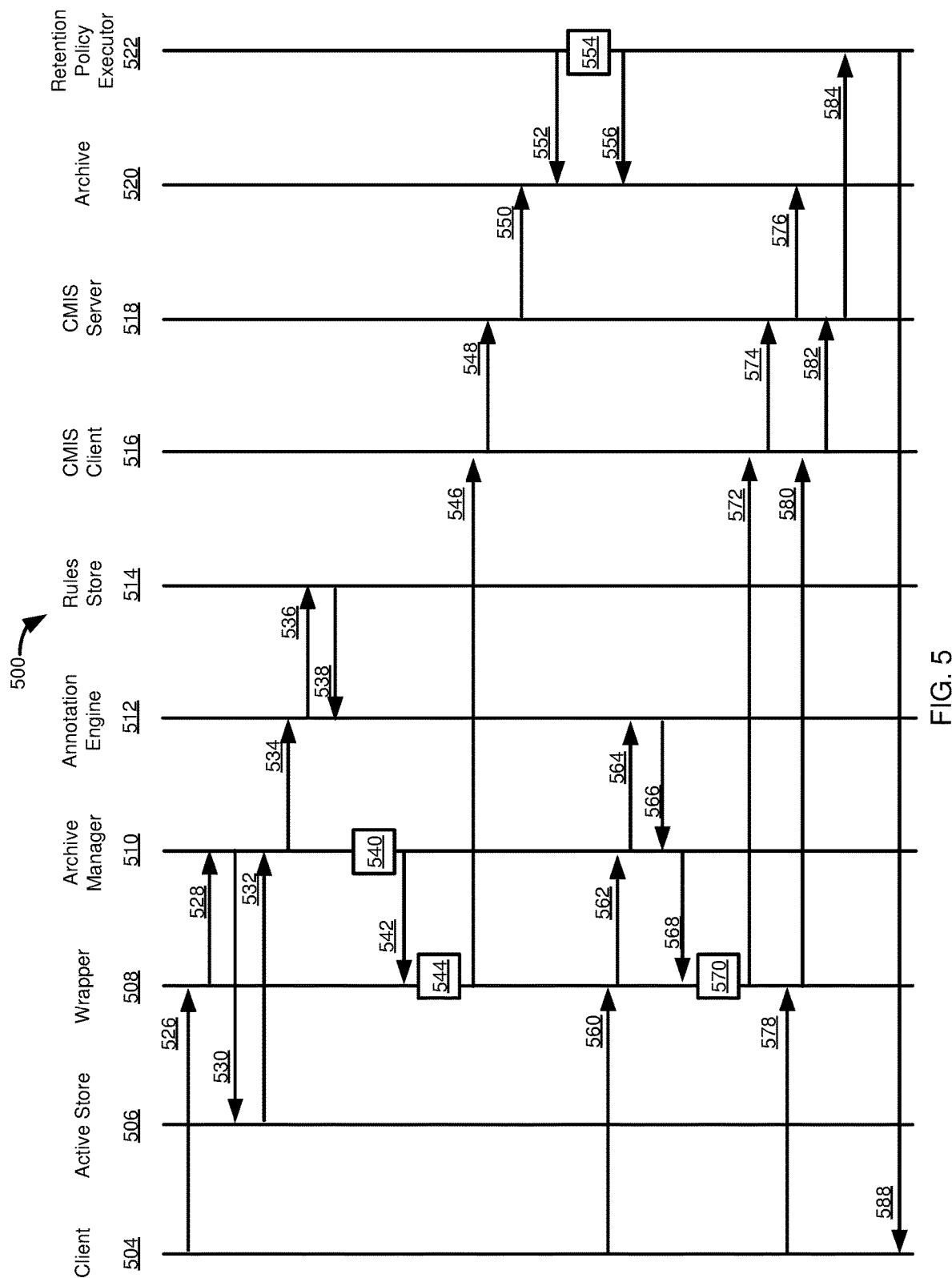
FIG. 5 is a diagram illustrating operations in archiving and deleting data, and updating retention policy information for data objects, including the use of a wrapper to convert an archive request, or operations associated therewith, between formats.

Example 5—Example Assignment of Expiration Dates and Retention Policy Enforcement with Wrapper FIG. 5 presents a diagram for operations 500 involved in storing a data object in an archive, automatically deleting the data object when an expiration event (e.g., the passing or reaching of an expiration date) has occurred, and applying a policy change, such as a legal hold, to the data object. The components and operations 500 are generally similar to the components and operations 400 FIG. 4. However, the operations 500 include a wrapper component that mediates communication with the CMIS client. The wrapper component can be useful when disclosed technologies are to be used with a retention manager that cannot directly use a protocol used by the archive system, such as when the retention manager is not compliant with the CMIS standard.

The operations 500 can be carried out by a client 504 (e.g., a user or a client application, including a user of a client application, which can be the document manager application 230 of FIG. 2), an active store 506 where source structured and unstructured data object are maintained (or, alternatively, another archive), a wrapper 508 (which can mediate execution of requests from the client 504, including formatting data to be useable by a CMIS client 516), an archive manager 510, an annotation engine 512, a rules store 514, the CMIS client 516, a CMIS server 518, an archive 520, and a retention policy executor 522. The components 506, 508, 510, 512, 514, 516, 518, 520, 522 can, at least in some aspects, be the same as, or generally analogous to, the correspondingly named components illustrated in FIG. 2, and discussed in Example 2.

The client 504 sends an archive request 526 that is intercepted by the wrapper 508. The request 526 can identify one or more structured data objects, unstructured data objects, or a combination thereof, to be transferred to the archive 520. The data objects can be specified directly or indirectly. Indirect specification can include specifying data objects meeting specific criteria. Indirect specification can also include data objects being included in a response to the request 526 because they are linked to another data object directly or indirectly specified by the request (e.g., unstructured data objects that are included in an attachment list or a print list to a structured data object).

The wrapper 508 forwards the request to the archive manager 510 in communication 528. The archive manager 510 sends a data object request 530 to the active store 506 for documents specified in the archive request 526. The active store 506 sends the responsive data objects to the archive manager 510 in communication 532. The archive manager 510 makes a call 534 to the annotation engine 512 to determine retention information for the data objects of the archive request 526. Determining retention information can include determining a retention policy that applies to the data objects, and typically includes determining an expiration date (e.g., an expiration date that is calculated based on the retention policy, and optionally individual properties of the data objects, such as a type of the data object or a date a data object was created or last modified).

In determining a policy or expiration date, the annotation engine 512 can send a request 536 to the rules store 514 for rule or policy information that applies to a particular data object or collection of data objects being annotated by the annotation engine 512. The relevant information is returned to the annotation engine 512 in response 538. The annotation engine 512 assigns an expiration date (and, optionally, other information, such as a policy, access list, purpose, which can be all or a portion of the metadata 262 of FIG. 2) to the data object or data objects at 540.

The wrapper 508 intercepts a communication 542 from the archive manager 510 that is a request to send annotated data objects to the archive 520. The wrapper 508 formats the request at 544 to be useable by the CMIS client 516. Annotated data objects are sent from the wrapper 508 to the CMIS client 516 in communication 546. The annotated data objects are sent by the CMIS client 516 to the CMIS server 518 in communication 548. The annotated data objects are sent from the CMIS server 518 to be stored in the archive 520 at 550.

Periodically, or on an ongoing basis, the retention policy executor 522 can determine whether any data objects in the archive 520 should be deleted. The retention policy executor 522 can access information regarding data objects in the archive 520 in request 552. At 554, the retention policy executor 522 determines whether data objects can be deleted. This determination can include determining if an expiration date has passed, and, optionally, whether the data objects are subject to a status flag, such as a legal hold. For instance, if the status flag is set to indicate that a data object should not be deleted, the retention policy executor 522 will not delete the data object even if the expiration date has passed. If the retention policy executor 522 determines that a data object can be deleted, a deletion command 556 can be sent to the archive 520, and the data object deleted.

The client 504 can send a request 560 for a status change to a data object stored in the archive 520. The status change can be a change to a policy that applies to the data object, manual assignment of an expiration date, or setting of a status flag, such as to indicate that the data object is, or is no longer, subject to a legal hold. The request 560 can be intercepted by the wrapper 508 and sent to the archive manger 510 in communication 562. The annotation engine 512 can be called by the archive manager 510 at 564, and the annotation engine 512 can provide a status change package in response 566.

The status change package can be intercepted by the wrapper 508 at 568 and formatted for the CMIS client 516 at 570. The formatted status change package can be sent from the wrapper to the CMIS client 516 in communication 572, from the CMIS client 516 to the CMIS server 518 in communication 574, and applied to the archive 520 by the CMIS server 518 in process 576. In some embodiments, a status change package can be created directly by the wrapper 508 or the annotation engine 512 and sent to the archive 520 by the wrapper, such as via the CMIS client 516 and the CMIS server 518.

The client 504 sends a request 578 to delete a data object from the archive 520. The request 578 is intercepted by the wrapper 508 and sent to the CMIS client 516 at 580. The request is forwarded from the CMIS client 516 to the CMIS server 518 at 582, and from the CMIS server 518 to the retention policy executor 522 at 584. The retention policy executor 522 can the carry out the process of 552, 554 to determine whether deletion is allowed. If deletion is allowed, a deletion command 556 can be sent from the retention policy executor 522 to the archive 520. The results of the deletion request can be returned to the client 504 at 588. That is, the client 504 can be notified if deletion was successful, or if deletion failed. Although shown as being sent directly from the retention policy executor 522 to the client 504, the status communication 588 is typically sent from the retention policy executor 522 to the CMIS server 518, from the CMIS server to the CMIS client 516, from the CMIS client to the wrapper 508, and from the wrapper to the client.

Example 6—Example Association List and Retention Policy Enforcement

Figure 6:
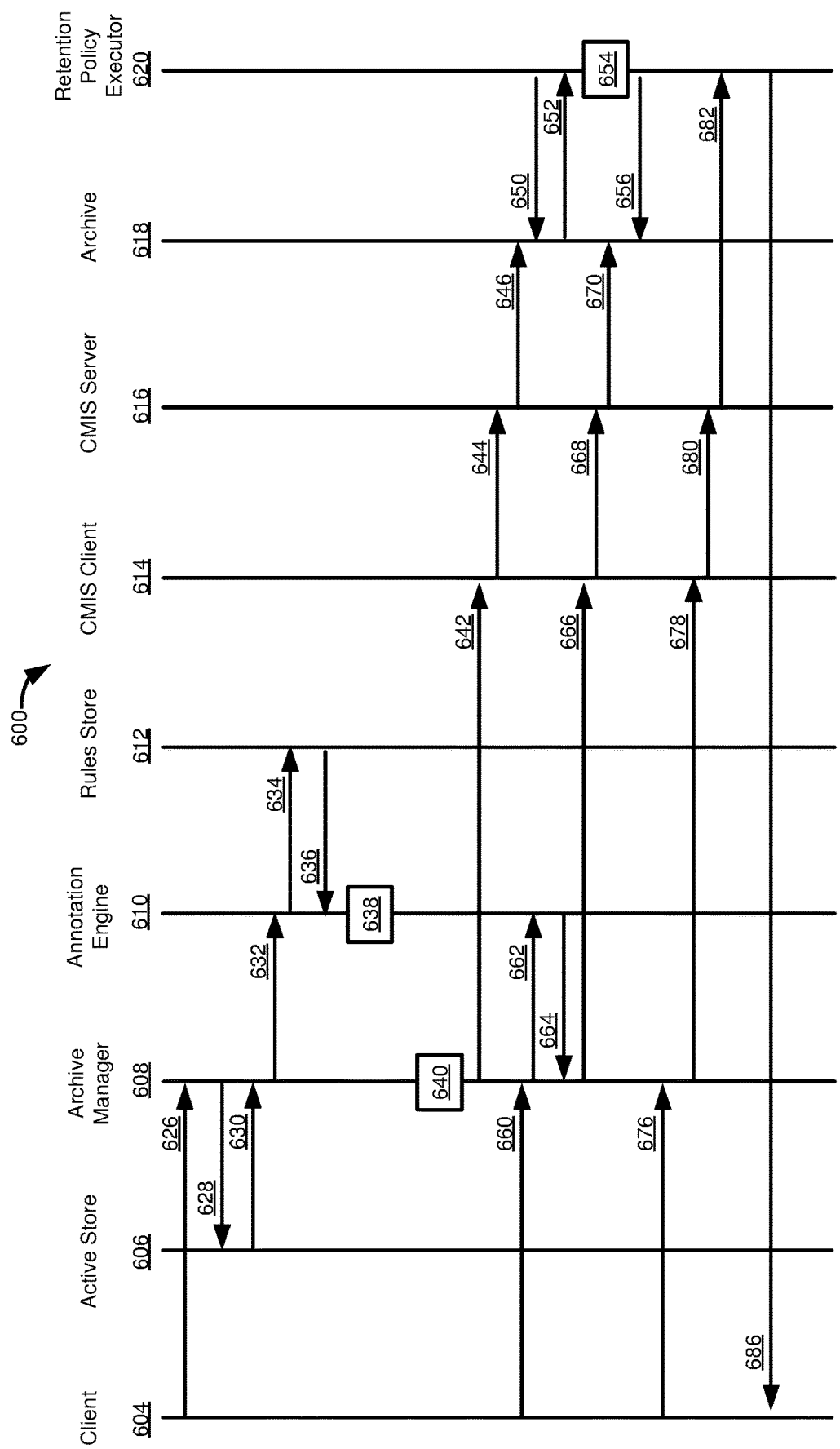
FIG. 6 is a diagram illustrating operations in creating association lists and automatically or manually deleting data objects associated with an association list.

FIG. 6 presents a diagram of operations 600 involved in storing related data objects (e.g., a structured data object and associated unstructured data objects, such as unstructured data objects in an attachment list or a print list) in an archive, automatically deleting the related data objects when an expiration event (e.g., the passing or reaching of an expiration date) has occurred, and applying a policy change, such as a legal hold, to the related data object. The components and operations are generally similar to FIG. 4.

The operations 600 can be carried out by a client 604 (e.g., a user or a client application, including a user of a client application, which can be the document manager application 230 of FIG. 2), an active store 606 (or, alternatively, another archive) where source structured and unstructured data object are maintained, an archive manager 608, an annotation engine 610, a rules store 612, a CMIS client 614, a CMIS server 616, an archive 618, and a retention policy executor 620. The components 606, 608, 610, 612, 614, 616, 618, 620 can, at least in some aspects, be the same as, or generally analogous to, the correspondingly named components illustrated in FIG. 2, and discussed in Example 2

The client 604 sends an archive request 626 to the archive manager 608. The request 626 can identify one or more structured data objects, unstructured data objects, or a combination thereof, to be transferred to the archive 618. The data objects can be specified directly or indirectly. Indirect specification can include specifying data objects meeting specific criteria. Indirect specification can also include data objects being included in a response to the request 626 because they are linked to another data object directly or indirectly specified by the request (e.g., unstructured data objects that are included in an attachment list or a print list to a structured data object).

The archive manager 608 sends a data object request 628 to the active store 606 for documents specified in the archive request 626. In at least some cases, prior to sending the data object request 628, the archive manager 608 can determine data objects responsive to the archive request 626, such as data objects (particularly unstructured data objects) that are indirectly specified by the archive request. Determining data objects responsive to the archive request can include formulating a request (e.g., a data object query) to retrieve appropriate items from the active store 606. For instance, if the archive request 626 specifies a particular structured data object, the archive manager 610 can structure the data object request 628 to retrieve the specified structured data object and any unstructured data objects referenced by the structured data object or having an appropriate association with the structured data object (e.g., being attached to the structured data object). Although not shown in FIG. 6, this determining can include additional communications between the archive manager 608 and the active store 606. That is, the archive manager 608 may request information from the active store 606 in order to determine what structured and unstructured data objects are available, and their properties, to use in forming the data object request 628 and then send the data object request.

The active store 606 sends the responsive data objects to the archive manager 608 in communication 630. The archive manager 608 makes a call 632 to the annotation engine 610 to determine retention information for the data objects of the archive request 626. Determining retention information can include determining a retention policy that applies to the data objects, and typically includes determining an expiration date (e.g., an expiration date that is calculated based on the retention policy, and optionally individual properties of the data objects, such as a type of a data object or a date a data object was created or last modified).

In determining a policy or expiration date, the annotation engine 610 can send a request 634 to the rules store 612 for rule or policy information that applies to a particular data object or collection of data objects being annotated by the annotation engine 610. The relevant information is returned to the annotation engine 610 in response 636. The annotation engine 610 assigns an expiration date (and, optionally, other information, such as a policy, access list, purpose, which can be all or a portion of the metadata 262 of FIG. 2) at 638.

At 640, the archive manager creates association lists (e.g., the association list 346 of FIG. 3) for any linked data objects (e.g., unstructured data objects that are associated with a particular structured data object). The association list can be used as a destruction list such that child data objects are linked with a parent data object and can be deleted when a parent data object is deleted, or can be independently be deleted. The association list can be maintained as part of the structured data object (e.g., included as a data member of a class representing the data object, or included as metadata for the data object), or can be maintained as a separate object (which can include a reference to the corresponding data object, and the data object can include a reference to the corresponding association list object). The archive manager 608 can also annotate the association list with information useable to determine when the association list, or data objects referenced by the association list, can be deleted, including setting any status flags (e.g., indicating a legal hold) or including an expiration date.

Annotated data objects (and association lists, if maintained as separate objects) are sent from the archive manager 608 to the CMIS client 614 in communication 642. The annotated data objects are sent by the CMIS client 614 to the CMIS server 616 in communication 644. The annotated data objects are sent from the CMIS server 616 to be stored in the archive 618 at 646.

Periodically, or on an ongoing basis, the retention policy executor 620 can determine whether any data objects in the archive 618 should be deleted. The retention policy executor 620 can access information regarding data objects in the archive 618 in request 650, receiving information from the archive in response 652. At 654, the retention policy executor 620 determines whether data objects can be deleted. This determination can include determining if an expiration date has passed, and, optionally whether the data objects are subject to a status flag, such as a legal hold. For instance, if the status flag is set to indicate that a data object should not be deleted, the retention policy executor 620 will not delete the data object even if the expiration date has passed. If the retention policy executor 620 determines that a data object can be deleted, also at 654, the retention policy executor can determine whether a data object to be deleted is linked to other documents that should be deleted, such as whether the data object to be deleted has an association list. If a data object has an association list, 654 can include determining which other data objects of the archive 618 should be deleted. A deletion command 656 can be sent to the archive 618, and the data object, and any child data objects identified by the association list, deleted.

A client 604 can send to the archive manager 608 a request 660 for a status change to a data object stored in the archive 618. The status change can be a change to a policy that applies to the data object, manual assignment of an expiration date, or setting of a status flag, such as to indicate that the data object is, or is no longer, subject to a legal hold. The request 660 can be forwarded to the annotation engine 610 in communication 662, and the annotation engine can provide a status change package in response 664. The status change package can be sent from the archive manager 608 to the CMIS client 614 in communication 666, from the CMIS client 614 to the CMIS server 616 in communication 668, and applied to the archive 618 by the CMIS server 616 in process 670. In some embodiments, a status change package can be created directly by the annotation engine 610 and sent to the archive 618, such as via the CMIS client 614 and the CMIS server 416.

In applying the status change package at 670, the CMIS server 618 can determine if the data object (or objects) associated with the status change package are linked with other data objects, such as through an association list. If a data object affected by the status change package has an association list, child data objects included in the association list can have their status information modified in the same way as their parent data object (typically, but in some cases the child object can be modified differently than a parent object). In a particular example, if the parent data object has a status flag set to indicate a legal hold, the child data objects can have their status flags set to indicate that they are also subject to the legal hold.

The client 604 sends to the archive manager 608 a request 676 to delete a data object from the archive 618. The request is forwarded from the archive manager 608 to the CMIS client 614 at 678, from the CMIS client 614 to the CMIS server 616 at 680, and from the CMIS server 616 to the retention policy executor 620 at 682. The retention policy executor 620 can the carry out the process of 652, 654 to determine whether deletion is allowed. If deletion is allowed, the deletion command 656 (including for any data objects linked to a data object specified in the request 676) can be sent from the retention policy executor 620 to the archive 618.

The results of the deletion request can be returned to the client 604 at 686. That is, the client 604 can be notified if deletion was successful, or if deletion failed. Although shown as being sent directly from the retention policy executor 620 to the client 604, the status communication 686 is typically sent from the retention policy executor 620 to the CMIS server 616, from the CMIS server to the CMIS client 614, from the CMIS client to the archive manager 608, and from the archive manager to the client.

The operations in FIG. 6 may be carried out in other manners. For instance, in some aspects, when a deletion request is received, the archive manager 608 can determine, such as by querying the archive 618 (including through the CMIS client 614 and the CMIS server 616) whether any data objects to be deleted have an association list. If so, the archive manager 608 can generate appropriate commands to direct the CMIS server 616 (or the retention policy executor 620) to delete the data objects indicated in the association list (assuming an expiration date has passed and no status flags indicate that the data objects should not be deleted).

Figure 7:
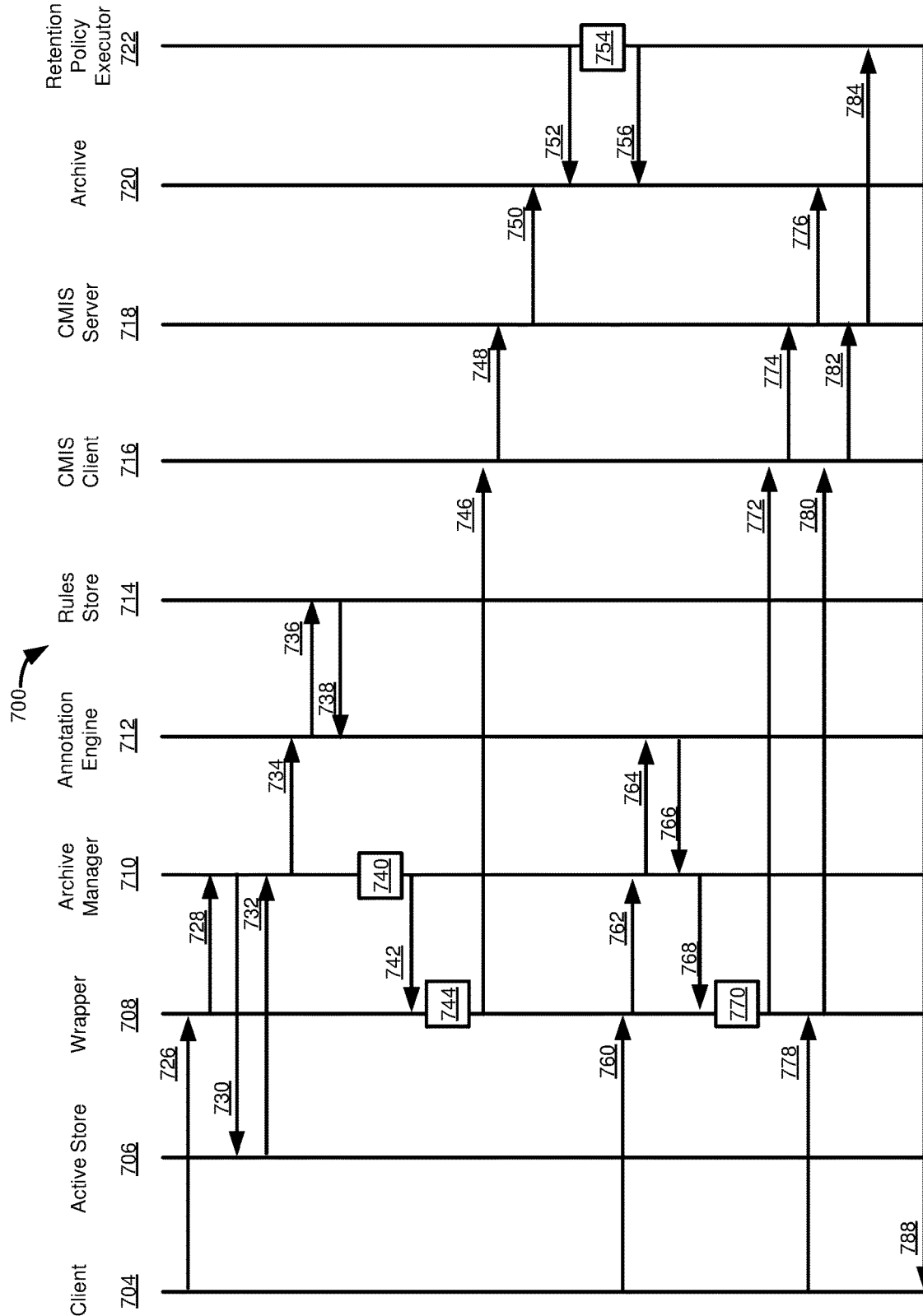
FIG. 7 is a diagram illustrating operations in creating association lists and automatically or manually deleting data objects associated with an association list, including the use of a wrapper to convert archival or deletion requests, or operations associated therewith, between formats.

Example 7—Example Association List and Retention Policy Enforcement with Wrapper FIG. 7 presents a timing diagram for operations 700 involved in storing related data objects (e.g., a structured data object and associated unstructured data objects, such as unstructured data objects in an attachment list or a print list) in an archive, automatically deleting the related data objects when an expiration event (e.g., the passing or reaching of an expiration date) has occurred, and applying a policy change, such as a legal hold, to the related data objects. The components and operations 700 are generally similar to the components and operations 500 of FIG. 5, including a wrapper component that mediates communication with the CMIS client. As discussed in Example 5, the wrapper component can be useful when disclosed technologies are to be used with a retention manager that cannot directly use a protocol used by the archive system, such as when the retention manager is not compliant with the CMIS standard.

The operations 700 can be carried out by a client 704 (e.g., a user or a client application, including a user of a client application, which can be the document manager application 230 of FIG. 2), an active store 706 (or, alternatively, another archive) where source structured and unstructured data object are maintained, a wrapper 708 (which can mediate execution of requests from the client, including formatting data to be useable by a CMIS client 716), an archive manager 710, an annotation engine 712, a rules store 714, the CMIS client 716, a CMIS server 718, an archive 720, and a retention policy executor 722. The components 706, 708, 710, 712, 714, 716, 718, 720, 722 can, at least in some aspects, be the same as, or generally analogous to, the correspondingly named components illustrated in FIG. 2, and discussed in Example 2.

The client 704 sends an archive request 726 that is intercepted by the wrapper 708. The request 726 can identify one or more structured data objects, unstructured data objects, or a combination thereof, to be transferred to the archive 720. The data objects can be specified directly or indirectly. Indirect specification can include specifying data objects meeting specific criteria. Indirect specification can also include data objects being included in a response to the request 726 because they are linked to another data object directly or indirectly specified by the request (e.g., unstructured data objects that are included in an attachment list or a print list to a structured data object).

The wrapper 708 forwards the request to the archive manager 710 in communication 728. The archive manager 710 sends a data object request 730 to the active store 706 for documents specified in the archive request 726. In at least some cases, prior to sending the data object request 730, the archive manager 710 can determine data objects responsive to the archive request 726, such as data objects (particularly unstructured data objects) that are indirectly specified by the archive request. Determining data objects responsive to the archive request can include formulating a request (e.g., a data object query) to retrieve appropriate items from the active store 706. For instance, if the archive request 726 specifies a particular structured data object, the archive manager 710 can structure the data object request 730 to retrieve the specified structured data object and any unstructured data objects referenced by the structured data object or having an appropriate association with the structured data object (e.g., being attached to the structured data object).

Although not shown in FIG. 7, this determining can include additional communications between the archive manager 710 and the active store 706. That is, the archive manager 710 may request information from the active store 706 in order to determine what structured and unstructured data objects are available, and their properties, to use in forming the data object request 730 and then send the data object request.

The active store 706 sends the responsive data objects to the archive manager 710 in communication 732. The archive manager 710 makes a call 734 to the annotation engine 712 to determine retention information for the data objects of the archive request 726. Determining retention information can include determining an expiration date (e.g., an expiration date that is calculated based on the retention policy, and optionally individual properties of the data objects, such as a type of a data object or a date a data object was created or last modified).

In determining a policy or expiration date, the annotation engine 712 can send a request 736 to the rules store 714 for rule or policy information that applies to a particular data object or collection of data objects being annotated by the annotation engine 712. The relevant information is returned to the annotation engine 712 in response 738. The annotation engine 712 assigns an expiration date (and, optionally, other information, such as a policy, access list, purpose, which can be all or a portion of the metadata 262 of FIG. 2) to the data object or data objects at 740.

The wrapper 708 intercepts a communication 742 from the archive manager 710 that is a request to send annotated data objects to the archive 720. At 744, the archive manager 710 creates association lists (e.g., the association list 346 of FIG. 3) for any linked data objects (e.g., unstructured data objects that are associated with a particular structured data object). The association list can be used as a destruction list such that child data objects are linked with a parent data object and can be deleted when a parent data object is deleted, or can be independently be deleted. The association list can be maintained as part of the structured data object (e.g., included as a data member of a class representing the data object, or included as metadata for the data object), or can be maintained as a separate object (which can include a reference to the corresponding data object, and the data object can include a reference to the corresponding association list object). The archive manager 710 can also annotate the association list with information useable to determine when the association list, or data objects referenced by the association list, can be deleted, including setting any status flags (e.g., indicating a legal hold) or including an expiration date.

Also at 744, the wrapper 708 formats the request 742 to be useable by the CMIS client 716. Annotated data objects (and association lists, if maintained as separate objects) are sent from the wrapper 708 to the CMIS client 716 in communication 746. The annotated data objects are sent by the CMIS client 716 to the CMIS server 718 in communication 748. The annotated data objects are sent from the CMIS server 718 to be stored in the archive 720 at 750.

Periodically, or on an ongoing basis, the retention policy executor 722 can determine whether any data objects in the archive 720 should be deleted. The retention policy executor 722 can access information regarding data objects in the archive 720 in request 752. At 754, the retention policy executor 722 determines whether data objects can be deleted. This determination can include determining if an expiration date has passed, and, optionally whether the data objects are subject to a status flag, such as a legal hold. For instance, if the status flag is set to indicate that a data object should not be deleted, the retention policy executor 722 will not delete the data object even if the expiration date has passed. If the retention policy executor 722 determines that a data object can be deleted, also at 752, the retention policy executor can determine whether a data object to be deleted is linked to other documents that should be deleted, such as whether the data object to be deleted has an association list. If a data object has an association list, 754 can including determining which other data objects of the archive 720 should be deleted. A deletion command 756 can be sent to the archive 720, and the data object, and any child data objects identified by the association list, deleted.

The client 704 can send a request 760 for a status change to a data object stored in the archive 720. The status change can be a change to a policy that applies to the data object, manual assignment of an expiration date, or setting of a status flag, such as to indicate that the data object is, or is no longer, subject to a legal hold. The request 760 can be intercepted by the wrapper 708 and sent to the archive manger 710 in communication 762. The annotation engine 712 can be called by the archive manager 710 at 764, and the annotation engine can provide a status change package in response 766. The status change package can be intercepted by the wrapper 708 at 768 and formatted for the CMIS client 716 at 770. The formatted status change package can be sent from the wrapper 708 to the CMIS client 716 in communication 772, from the CMIS client 716 to the CMIS server 718 in communication 774, and applied to the archive 720 by the CMIS server 718 in process 776. In some embodiments, a status change package can be created directly by the wrapper 708 or the annotation engine 712 and sent to the archive 720 by the wrapper, such as via the CMIS client 716 and the CMIS server 718.

In applying the status change package at 776, the CMIS Server 718 can determine if the data object (or objects) associated with the status change package are linked with other data objects, such as through an association list. If a data object affected by the status change package has an association list, child data objects included in the association list can have their status information modified in the same way as their parent data object (typically, but in some cases the child object can be modified differently than a parent object). In a particular example, if the parent data object has a status flag set to indicate a legal hold, the child data objects can have their status flags set to indicate that they are also subject to the legal hold.

The client 704 sends a request 778 to delete a data object from the archive 720. The request 778 is intercepted by the wrapper 708 and sent to the CMIS client 716 at 780. The request is forwarded from the CMIS client 716 to the CMIS server 718 at 782, and from the CMIS server 718 to the retention policy executor 722 at 784. The retention policy executor 722 can the carry out the process of 752, 754 to determine whether deletion is allowed. If deletion is allowed, a deletion command 756 (including for any data objects linked to a data object specified in the request 778) can be sent from the retention policy executor 722 to the archive 720.

The results of the deletion request can be returned to the client 704 at 788. That is, the client 704 can be notified if deletion was successful, or if deletion failed. Although shown as being sent directly from the retention policy executor 722 to the client 704, the status communication 788 is typically sent from the retention policy executor to the CMIS server 718, from the CMIS server to the CMIS client 716, from the CMIS client to the wrapper 708, and from the wrapper to the client.

The operations in FIG. 7 may be carried out in other manners. For instance, in some aspects, when a deletion request is received, the wrapper 708 can determine, such as by querying the archive 720 (including through the CMIS client 716 and CMIS server 718) whether any data objects to be deleted have an association list. If so, the wrapper 708 can generate appropriate commands to direct the CMIS server 718 (or the retention policy executor 722) to delete the data objects indicated in the association list (assuming an expiration date has passed and no status flags indicate that the data objects should not be deleted).

Example 8—Example Operations in Retention Policy Enforcement

Figure 8:
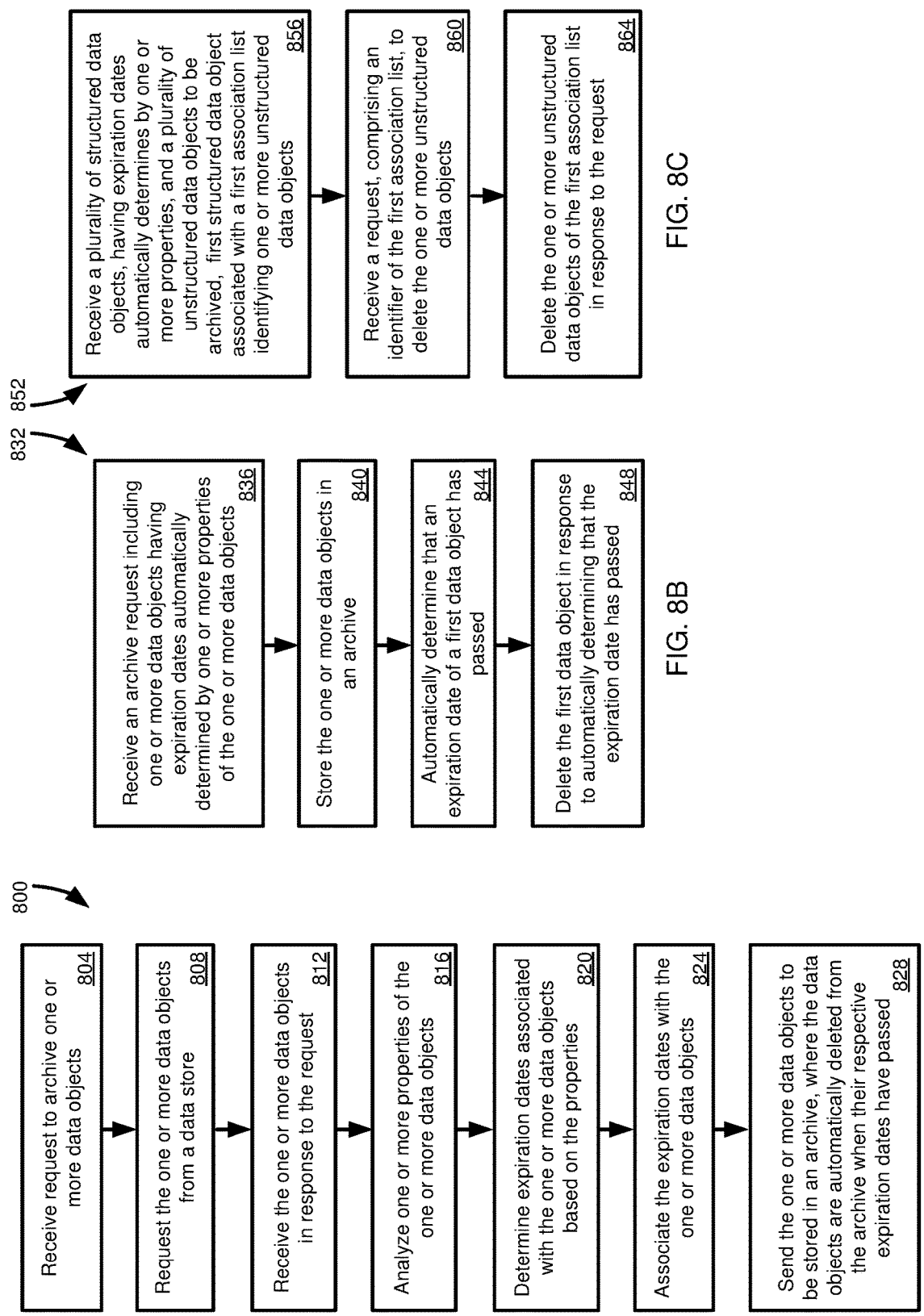
FIG. 8A is a flowchart illustrating operations in a method of assigning expiration dates to data objects to be archived, where the data objects are automatically deleted from the archive after the expiration date.
FIG. 8B is a flowchart illustrating operations in a method of automatically deleting data objects from an archive after an expiration date has passed, where the data objects were assigned expiration dates automatically, as determined by one or more properties of the data objects.
FIG. 8C is a flowchart illustrating operations in a method of deleting unstructured data objects included in an association list for a structured data object.

FIG. 8A illustrates a method 800 for annotating one or more data objects to be archived with expiration dates after which the one or more data objects will be automatically deleted from an archive. The method 800 can be carried out, for example, using the architecture 200 of FIG. 2.

At 804, a request is received to archive one or more data objects. The one or more data objects are requested from a data store, such an active data store (but in other cases, another archive or other data store) at 808. At 812, the one or more data objects are received in response to the request. One or more properties of the one or more data object are analyzed at 816. At 820, expiration dates are determined that are associated with the one or more data objects based on properties of the one or more data objects. The expiration dates are associated with the one or more data objects at 824. At 828, the one or more data objects are send to be stored in an archive, where the data objects are automatically deleted from the archive when their respective expiration dates have passed.

FIG. 8B illustrates a method 832 for archiving a first data object having an expiration date and automatically deleting the first data object once the expiration date has passed. The method 832 can be carried out, for example, using the architecture 200 of FIG. 2. At 836, an archive request is received that includes one or more data objects having expiration dates automatically determined by one or more properties of the one or more data objects. The one or more data objects are stored in an archive at 840. At 844, it is automatically determined that an expiration date of a first data object has passed. The first data object is deleted, at 848, in response to automatically determining that its expiration date has passed.

FIG. 8C illustrates a method 852 for deleting objects in an association list. The method 852 can be carried out, for example, using the architecture 200 of FIG. 2. At 856, a plurality of structured data objects and a plurality of unstructured data objects are received. The structured data objects have expiration dates automatically determined by one or more properties of the structured data objects. A first structured data object is associated with a first association list identifying one or more unstructured data objects. A request is received at 860 that includes an identifier of the first association list and indicates that the one or more unstructured data objects identified in the association list are to be deleted. The one or more unstructured data objects identified in the first association list are deleted at 864 in response to the request.

Example 9—Computing Systems

Figure 9:
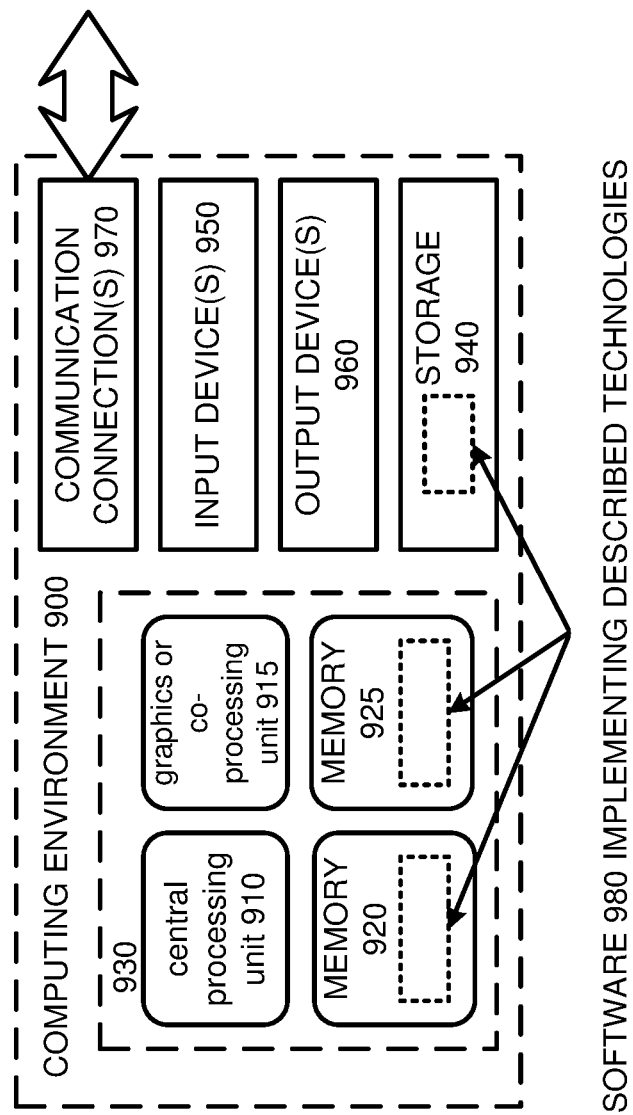
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing a data archival environment, and associated methods, such as described Examples 2-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940 (such as for storing data of the active data store 208 or the archive 212 of FIG. 2), one or more input devices 950, one or more output devices 960, and one or more communication connections 970, including input devices, output devices, and communication connections for interacting with a user, such as through the user interface 232 of FIG. 2. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 10:
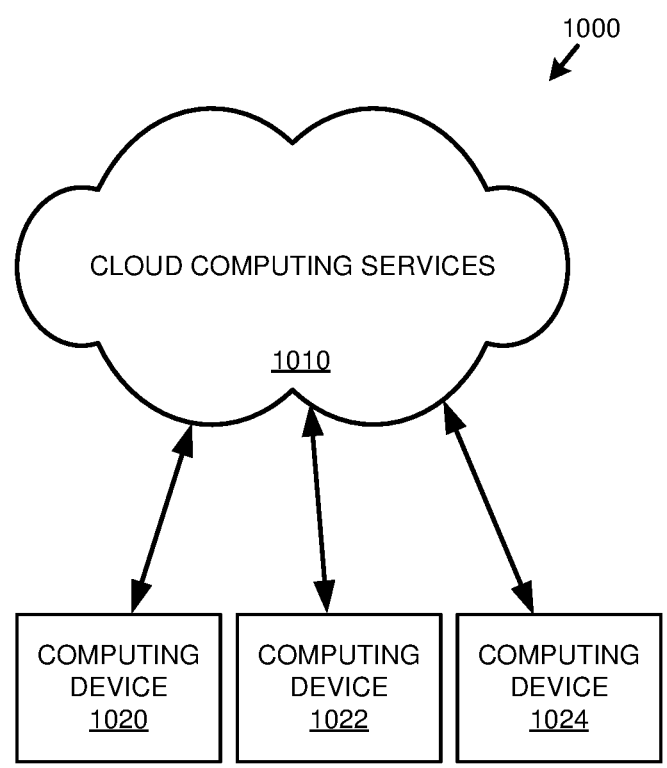
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more computer-readable storage media storing computer-executable instructions for causing a computing system, the computing system comprising one or more processing units and one or more memories, when programmed thereby to perform operations for archiving and automatically deleting data objects, the operations comprising:
  receiving a request to archive a plurality of first data objects, the plurality of first data objects comprising one or more structured data objects and one or more unstructured data objects;
  requesting the plurality of first data objects from a data store;
  receiving the plurality of first data objects in response to the request;
  analyzing one or more properties of the plurality of first data objects;
  determining expiration dates associated with at least one of plurality of first data objects based at least in part on the one or more properties;
  associating the expiration dates with one or more of the plurality of first data objects; and
  generating an association list that links at least one of the one or more unstructured data objects with at least one of the one or more structured data objects, the association list being maintained in a first structured data object, the first structured data object being a structured data object of the one or more structured data objects or a structured data object that is not a structured data object of the one or more structured data objects; and
  sending the plurality of first data objects and the first structured data object to an archive to be stored, wherein the plurality of first data objects are automatically deleted by the archive when the expiration date has passed and wherein the association list is stored in the archive with the first structured data object.

2. The one or more computer-readable storage media of claim 1, wherein the association list is stored in metadata of the first structured data object stored in the archive and the first structured data object is a structured data object of the one or more structured data objects.

3. The one or more computer-readable storage media of claim 1, wherein receiving the request to archive a plurality of first data objects comprises intercepting the request with a wrapper layer and the operations further comprise:
  transforming the request from a first format to a second format, wherein the request in the second format is processed to send the one or more data objects to the archive to be stored.

4. The one or more computer-readable storage media of claim 3, wherein the second format is the Content Management Interoperability Services standard.

5. The one or more computer-readable storage media of claim 4, wherein the first format is the WebDAV format.

6. A computing system that implements a data archival service, the computing system comprising:
  one or more memories;
  one or more processing units coupled to the one or more memories; and
  one or more non-transitory computer readable storage media storing instructions that, when loaded into the memory, cause the one or more processing units to perform operations for:
    intercepting an archive request in a first format with a wrapper layer, the archive request specifying one or more data objects, the one or more data objects having expiration dates automatically determined by one or more properties of the one or more data objects;
    transforming the request from a first format to a second format, the second format being different than the first format;
    storing the one or more data objects in an archive in response to processing the request in the second format;
    automatically determining that an expiration date of a first data object of the one or more data objects has passed; and
    deleting the first data object from the archive in response to automatically determining that the expiration date of the first data object has passed.

7. The computing system of claim 6, the operations further comprising:
  determining that the first data object is associated with a second data object and deleting the second data object from the archive when the expiration date of the first data object has passed.

8. The computing system of claim 7, wherein the first data object is a structured data object and the second data object is an unstructured data object.

9. The computing system of claim 6, the operations further comprising:
  receiving a request to update a retention status of a second data object of the one or more data objects;
  updating the retention status of the second data object;
  determining that the second data object is associated with a third data object of the one or more data objects; and
  updating the retention status of the third data object based on the request to update the retention status of the second data object.

10. The computing system of claim 9, wherein the request to update the retention status comprises a request to change the expiration date of the second data object.

11. The computing system of claim 9, wherein the request to update the retention status comprises a request to set a status flag to override the expiration date, wherein the second and third data objects are not deleted if the status flag is set even if the expiration date of the second data object has passed.

12. The computing system of claim 11, the operations further comprising:
  receiving a user request to delete the second data object;
  determining that the status flag has been set; and
  returning a message to the user that the second data object cannot be deleted.

13. The computing system of claim 9, the operations further comprising:
  receiving a user request to delete the second data object;
  determining that the expiration date has not passed; and
  returning a message to the user that the second data object cannot be deleted.

14. A method, implemented in a computing environment, comprising:
  receiving a plurality of structured data objects and a plurality of unstructured data objects to be archived, at least the plurality of structured data objects having expiration dates automatically determined by one or more properties of respective structured data object, a first structured data object being associated with a first association list identifying one or more unstructured data objects that are associated with the at least a first structured data object;

storing the first association list in an archive in a first structured data object, the first structured data object being a structured data object of the plurality of structured data objects or a structured data object not in the plurality of structured data objects;

receiving a request to delete the one or more unstructured data objects, the request comprising an identifier of the first association list; and deleting the one or more unstructured data objects of the first association list in response to the request.

15. The method of claim 14, further comprising:

receiving a request to delete one or more unstructured data objects of a second association list associated with a second structured data object, the request comprising an identifier of the second association list;

determining that an expiration date of the second structured data object has not passed; and returning a message that the one or more unstructured data objects of the second association list cannot be deleted.

16. The method of claim 14, further comprising:

receiving a request to delete one or more unstructured data objects of a second association list associated with a second structured data object, the request comprising an identifier of the second association list;

determining that that the second structured data object has a status flag overriding an expiration date of the second structured data object, wherein the second structured data object is not deleted if the status flag is set even if the expiration date of the second structured data object has passed; and returning a message that the one or more unstructured data objects of the second association list cannot be deleted.

17. The method of claim 14, wherein the first association list is maintained as part of the first structured data object.

18. The method of claim 14, wherein receiving the request comprises intercepting the request with a wrapper layer and the operations further comprise:

transforming the request from a first format to a second format, wherein the request in the second format is processed to delete the one or more unstructured data objects.

19. The one or more computer-readable storage media of claim 1, wherein the first data structured data object is a structured data object of the one or more structured data objects.

20. The one or more computer-readable storage media of claim 1, wherein the first structured data object is instantiated in response to the receiving a request.

* * * * *